(12) United States Patent
Geng et al.

(10) Patent No.: US 12,081,279 B2
(45) Date of Patent: Sep. 3, 2024

(54) RADIO FREQUENCY CHIPS HAVING WAVEFORM GENERATORS FOR SELF-TESTING

(71) Applicant: ZEKU TECHNOLOGY (SHANGHAI) CORP., LTD., Shanghai (CN)

(72) Inventors: Jifeng Geng, San Diego, CA (US); Hong Kui Yang, San Diego, CA (US)

(73) Assignee: ZEKU TECHNOLOGY (SHANGHAI) CORP., LTD., Shanghai (CN)

( * ) Notice: Subject to any disclaimer, the term of this patent is extended or adjusted under 35 U.S.C. 154(b) by 164 days.

(21) Appl. No.: 17/878,289

(22) Filed: Aug. 1, 2022

(65) Prior Publication Data

US 2022/0368434 A1 Nov. 17, 2022

Related U.S. Application Data

(63) Continuation of application No. PCT/IB2020/060832, filed on Nov. 18, 2020.

(60) Provisional application No. 62/970,336, filed on Feb. 5, 2020.

(51) Int. Cl.
*H04B 17/14* (2015.01)
*H04B 17/19* (2015.01)

(52) U.S. Cl.
CPC .......... *H04B 17/14* (2015.01); *H04B 17/19* (2015.01)

(58) Field of Classification Search
CPC .......... G06F 17/14; H04B 1/40; H04B 1/713; H04B 17/00; H04B 17/14; H04B 17/15; H04B 17/19; H04K 1/00; H04L 25/03; H04L 27/08; H04L 27/26; H04L 27/28

USPC ....... 375/135, 136, 224, 260, 296, 340, 348; 702/122; 708/405
See application file for complete search history.

(56) References Cited

U.S. PATENT DOCUMENTS

| | | | |
|---|---|---|---|
| 7,280,564 B1 * | 10/2007 | Geile | H04K 1/00 370/507 |
| 7,817,734 B2 * | 10/2010 | Subramanyam | H04L 5/023 375/260 |
| 9,385,774 B2 | 7/2016 | Chakraborty | |
| 2006/0085497 A1 | 4/2006 | Sehitoglu | |

(Continued)

FOREIGN PATENT DOCUMENTS

WO 2018119153 A2 6/2018

OTHER PUBLICATIONS

International Search Report Re. International Application No. PCT/IB2020/060832, mailed May 21, 2021.

(Continued)

*Primary Examiner* — Shawkat M Ali
(74) *Attorney, Agent, or Firm* — BAYES PLLC (57) ABSTRACT

Embodiments of apparatus and method for generating waveforms for self-testing of radio frequency (RF) chips are disclosed. In an example, an RF chip includes an RF front-end and a digital front-end. The digital front-end includes an inverse fast Fourier transform (IFFT) module configured to generate at least one M-point IFFT sample, where M is a positive integer, and an IFFT sample transformation module configured to generate an L-point IFFT testing signal based on the at least one M-point IFFT sample. L is a positive integer greater than M and the L-point IFFT testing signal is configured to test a function of the RF chip.

20 Claims, 8 Drawing Sheets

(56) References Cited

U.S. PATENT DOCUMENTS

2010/0049465 A1 2/2010 Pineda De Gyvez et al.
2011/0069737 A1* 3/2011 Jalali ................. H04W 72/0453
 375/267
2015/0381273 A1 12/2015 Gloeckner et al.
2016/0295561 A1* 10/2016 Papasakellariou .... H04W 72/23
2018/0375707 A1* 12/2018 Bala .................... H04L 27/2605

OTHER PUBLICATIONS

Written Opinion of the International Searching Authority Re. International Application No. PCT/IB2020/060832, mailed May 21, 2021.

* cited by examiner

RADIO FREQUENCY CHIPS HAVING WAVEFORM GENERATORS FOR SELF-TESTING

CROSS-REFERENCE TO RELATED APPLICATIONS

This application is a continuation of International Application No. PCT/IB2020/060832, filed on Nov. 18, 2020, which claims the benefit of priority to U.S. Provisional Application No. 62/970,336 filed on Feb. 5, 2020, entitled "OFDM SELFTEST WAVEFORM GENERATION," the contents of which are hereby incorporated by reference in their entireties.

BACKGROUND

Embodiments of the present disclosure relate to apparatus and method for wireless communication.

Wireless communication systems are widely deployed to provide various telecommunication services such as telephony, video, data, messaging, and broadcasts. Orthogonal frequency division multiplexing (OFDM) is one of the most widely used and adopted digital multi-carrier modulation methods and has been used extensively for cellular communications, such as 4th-generation (4G) Long Term Evolution (LTE) and 5th-generation (5G) New Radio (NR). One version of OFDM, for example, used in 4G LTE, is cyclic prefix OFDM (CF-OFDM), which has a waveform format that is designed to overcome the inter-symbol interference (ISI) resulting from delays and reflections.

SUMMARY

Embodiments of apparatus and method for generating waveforms for self-testing of radio frequency (RF) chips are disclosed herein.

In one example, an RF chip includes an RF front-end and a digital front-end. The digital front-end includes an inverse fast Fourier transform (IFFT) module configured to generate at least one M-point IFFT sample, where M is a positive integer, and an IFFT sample transformation module configured to generate an L-point IFFT testing signal based on the at least one M-point IFFT sample. L is a positive integer greater than M and the L-point IFFT testing signal is configured to test a function of the RF chip.

In another example, an RF chip includes a digital front-end including an IFFT module, N readers where N is a positive integer, N frequency shifters, and an adder. The IFFT module is configured to generate at least one M-point IFFT sample based on a resource block (RB) configuration and a pseudo-random binary sequence, where M is a positive integer. Each of the N readers is configured to generate an output IFFT sample based on one of the at least one M-point IFFT sample. Each of the generated N output IFFT samples is different from one another. Each of the N frequency shifters is configured to shift a central frequency of an output IFFT sample generated by a respective reader of the N readers to separate the central frequencies of the output IFFT samples of the N readers. The adder is configured to combine the shifted N output IFFT samples to generate an L-point IFFT testing signal, where L is a positive integer greater than M and M×N=L.

In yet another example, a method for self-testing of an RF chip is disclosed. At least one M-point IFFT sample is generated based on a resource block (RB) configuration and a pseudo-random binary sequence, where M is a positive integer. N output IFFT samples are generated based on the at least one M-point IFFT sample, where N is a positive integer. Each of the generated N output IFFT samples is different from one another. Each of the N output IFFT samples is shifted to separate the central frequencies of the output IFFT samples. The shifted N output IFFT samples are combined to generate an L-point IFFT testing signal configured to test a function of the RF chip, where L is a positive integer greater than M and M×N=L.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as GSM. An OFDMA network may implement a RAT, such as LTE or NR. The techniques described herein may be used for the wireless networks and RATs mentioned above, as well as other wireless networks and RATs.

In modern wireless communication networks, system on chips (SoC) are widely used for communicating information. SoC normally includes a baseband chip for modulating the raw data, generating OFDM symbols based on the modulated symbol, performing other data processing operations such as CP insertion, gain adjustments, and pulesshaping, and an RF chip for converting the symbols from digital signals to analog signals (e.g., RF signals) for transmission. Modulated symbols such as OFDM symbols may be transmitted from the baseband chip to the RF chip for transmission through digital interfaces between the baseband chip and the RF chip.

Because the digital signals are normally generated and modulated on the baseband, it is hard to test and calibrate the function of the RF chip, for example, the capacity of the RF chip for processing and/or transmitting signals on a full range of working bandwidth (e.g., 5 MHz to 800 MHz for cyclic prefix-orthogonal frequency division multiplexing (CP-OFDM) waveforms) without the involvement of the baseband chip. For self-testing and self-calibration without the baseband chip, conventional RF chips use waveform generators having full 4096-point inverse fast Fourier transform (IFFT) module, or a reduced sized (e.g., a 1028-point) IFFT module to generate testing signals, or use external circuit(s) (e.g., a baseband modem or field-programmable gate arrays (FPGAs)) to store testing signals with different waveforms.

All the above-mentioned schemes have drawbacks. For example, using waveform generators having a full 4096-point IFFT module is very expensive and complicated to implement. Using waveform generators having a reduced sized IFFT module (e.g., having less than 4096 points IFFT) cannot support a full range test on the entire working bandwidth of, for example, waveforms used in 5G wireless networks (e.g., 5G CP-OFDM symbols with higher than 100 MHz frequencies may need IFFT module(s) having at least 4096-point IFFT to generate). Using external circuit(s) may take up extra space, and the external circuit(s) can only store a limited number of waveforms. That being said, each time to test a signal having a different resource block (RB) configuration (e.g., the smallest unit of resources that can be allocated to a user, such as, 12×15 kHz tones/subcarriers), a new waveform must be pre-programmed and uploaded to the external circuit(s), which can be very time consuming and hard to implement.

Various embodiments in accordance with the present disclosure provide an improved waveform generator on an RF chip (e.g., the digital front-end of the RF chip) to perform self-testing and/or self-calibration on a full range of working bandwidth (e.g., 3rd Generation Partnership Project (3GPP) for mobile telecommunications, and/or frequency range 1 (FR1) and frequency range 2 (FR2) for 5G). The waveform generator described herein uses an IFFT module reduced in size (e.g., having IFFT points less than 4096) and reuses components of the existing processing chain (e.g., buffer(s), frequency shifter(s), and/or an adder) on a digital front-end of the RF chip to generate testing signals having equivalent properties (e.g., in both time and frequency domains) to waveforms generated by an IFFT module with higher resolution (e.g., 4096 or more points IFFT module). The generator can also generate multiple waveforms for various residual side-band (e.g., a signal I/Q imbalance) calibrations. Accordingly, the testing signals generated by the improved waveform generator can be used to perform self-test and/or self-calibration for the function of the RF chip (e.g., the functioning performance of an RF front-end of the RF chip) on a full range of working bandwidth.

Figure 1:
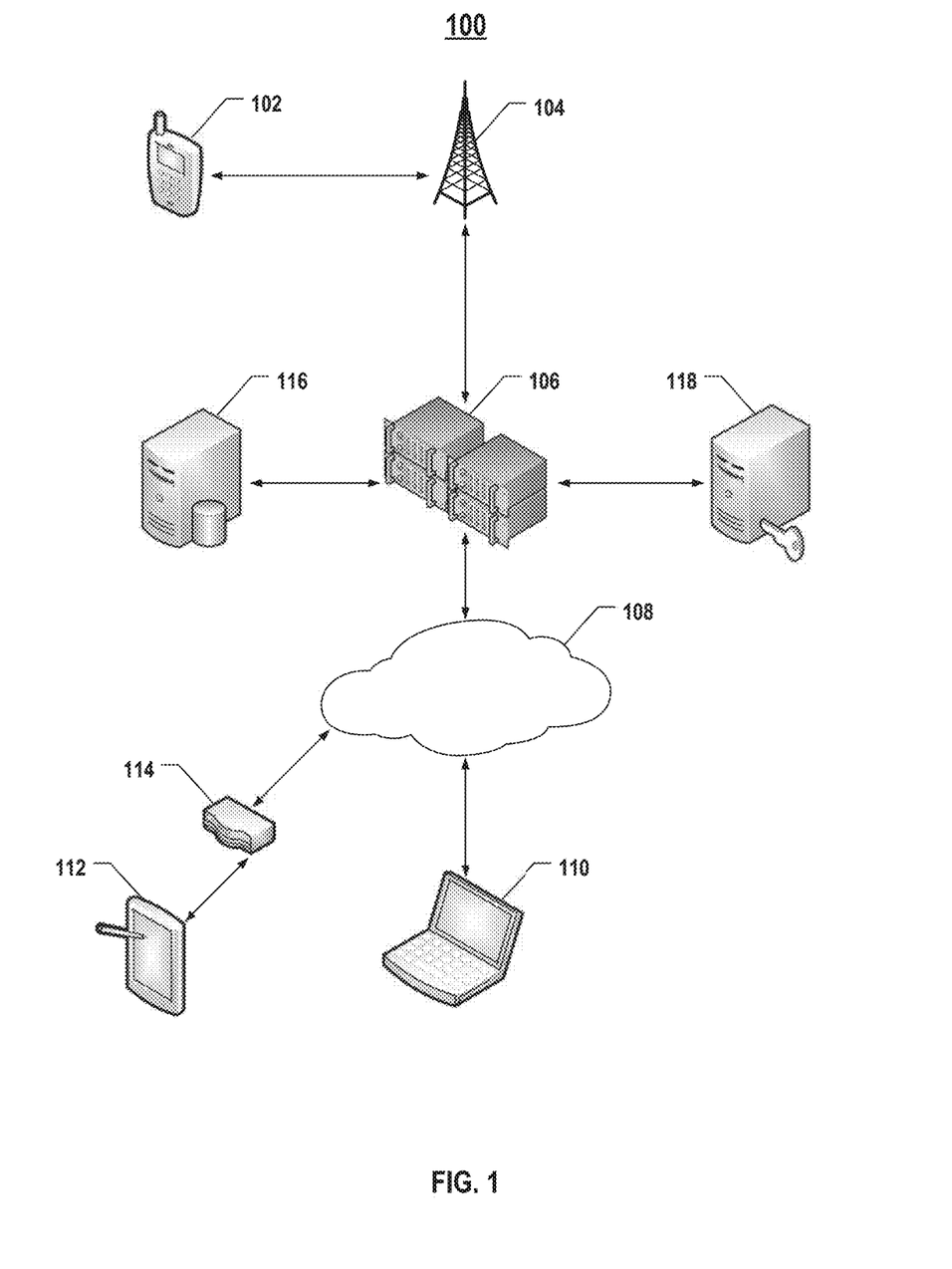
FIG. 1 illustrates an exemplary wireless network, according to some embodiments of the present disclosure.

FIG. 1 illustrates an exemplary wireless network 100, in which certain aspects of the present disclosure may be implemented, according to some embodiments of the present disclosure. As shown in FIG. 1, wireless network 100 may include a network of nodes, such as a user equipment (UE) 102, an access node 104, and a core network element 106. User equipment 102 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 102 is illustrated as a mobile phone simply by way of illustration and not by way of limitation.

Access node 104 may be a device that communicates with user equipment 102, such as a wireless access point, a base station (BS), a Node B, an enhanced Node B (eNodeB or eNB), a next-generation NodeB (gNodeB or gNB), a cluster master node, or the like. Access node 104 may have a wired connection to user equipment 102, a wireless connection to user equipment 102, or any combination thereof. Access node 104 may be connected to user equipment 102 by multiple connections, and user equipment 102 may be connected to other access nodes in addition to access node 104. Access node 104 may also be connected to other user equipments. It is understood that access node 104 is illustrated by a radio tower by way of illustration and not by way of limitation.

Core network element 106 may serve access node 104 and user equipment 102 to provide core network services. Examples of core network element 106 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 106 includes an access and mobility management function (AMF) device, a session management function (SMF) device, or a user plane function (UPF) device, of a core network for the NR system. It is understood that core network element 106 is shown as a set of rack-mounted servers by way of illustration and not by way of limitation.

Core network element 106 may connect with a large network, such as the Internet 108, or another Internet Protocol (IP) network, to communicate packet data over any distance. In this way, data from user equipment 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the specific entity to perform user equipment authentication. In some embodiments, a single server rack may handle multiple such functions, such that the connections between core network element 106, authentication server 118, and database 116, may be local connections within a single rack.

Figure 8:
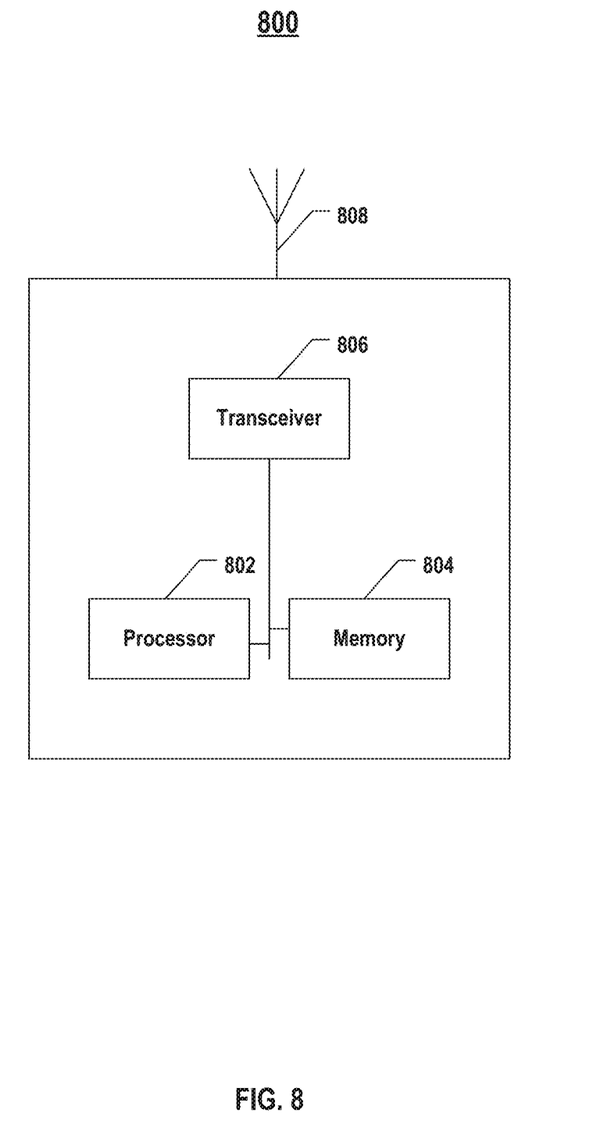
FIG. 8 illustrates a block diagram of an exemplary node, according to some embodiments of the present disclosure.

Each element in FIG. 1 may be considered a node of wireless network 100. More detail regarding the possible implementation of a node is provided by way of example in the description of a node 800 in FIG. 8. Node 800 may be configured as user equipment 102, access node 104, or core network element 106 in FIG. 1. Similarly, node 800 may also be configured as computer 110, router 114, tablet 112, database 116, or authentication server 118 in FIG. 1. As shown in FIG. 8, node 800 may include a processor 802, a memory 804, and a transceiver 806. These components are shown as connected to one another by a bus, but other connection types are also permitted. When node 800 is user equipment 102, additional components may also be included, such as a user interface (UI), sensors, and the like. Similarly, node 800 may be implemented as a blade in a server system when node 800 is configured as core network element 106. Other implementations are also possible.

Transceiver 806 may include any suitable device for sending and/or receiving data. Node 800 may include one or more transceivers, although only one transceiver 806 is shown for simplicity of illustration. An antenna 808 is shown as a possible communication mechanism for node 800. Multiple antennas and/or arrays of antennas may be utilized. Additionally, examples of node 800 may communicate using wired techniques rather than (or in addition to) wireless techniques. For example, access node 104 may communicate wirelessly to user equipment 102 and may communicate by a wired connection (for example, by optical or coaxial cable) to core network element 106. Other communication hardware, such as a network interface card (NIC), may be included as well.

As shown in FIG. 8, node 800 may include processor 802. Although only one processor is shown, it is understood that multiple processors can be included. Processor 802 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 802 may be a hardware device having one or more processing cores. Processor 802 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 8, node 800 may also include memory 804. Although only one memory is shown, it is understood that multiple memories can be included. Memory 804 can broadly include both memory and storage. For example, memory 804 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 802. Broadly, memory 804 may be embodied by any computer-readable medium, such as a non-transitory computer-readable medium.

Processor 802, memory 804, and transceiver 806 may be implemented in various forms in node 800 for performing wireless communication functions. In some embodiments, processor 802, memory 804, and transceiver 806 of node 800 are implemented (e.g., integrated) on one or more system-on-chips (SoCs). In one example, processor 802 and memory 804 may be integrated on an application processor (AP) SoC (sometimes known as a "host," referred to herein as a "host chip") that handles application processing in an operating system environment, including generating raw data to be transmitted. In another example, processor 802 and memory 804 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 802 and transceiver 806 (and memory 804 in some cases) may be integrated on a RF SoC (sometimes known as a "transceiver," referred to herein as an "RF chip") that transmits and receives RF signals with antenna 808. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 1, in some embodiments, any suitable node of wireless network 100 (e.g., user equipment 102 or access node 104) in transmitting signals to another node, for example, from user equipment 102 to access node 104 via an uplink (UL) or downlink (DL), may implement the self-testing and/or self-calibration schemes described herein to test and/or calibrate the function of an RF chip of the apparatus (e.g., screening and/or calibrating). For example, the calibration data can be store in a non-volatile memory on the apparatus or can be stored on a server and be associated with the tested RF chip through the serial number assigned to the RF chip.

Figure 2:
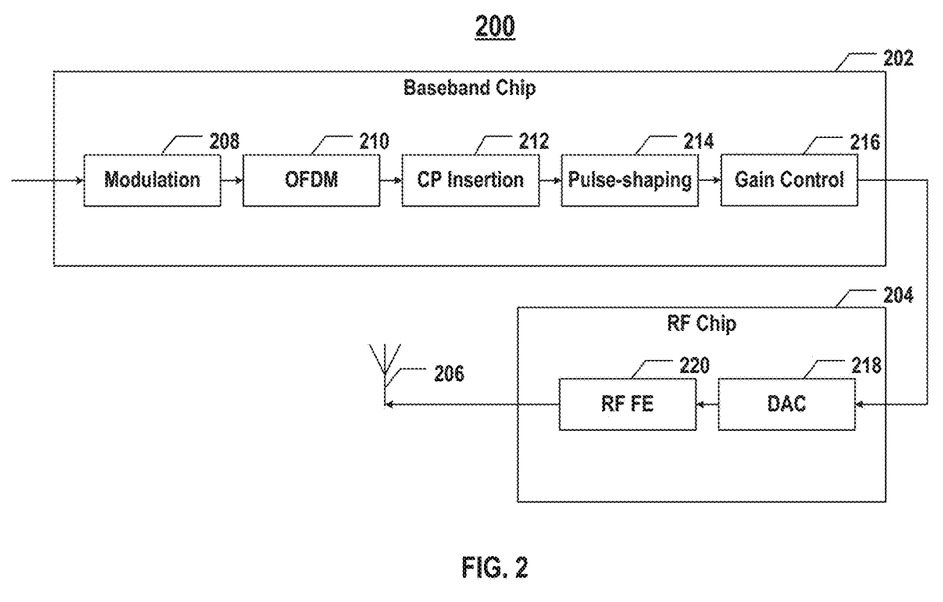
FIG. 2 illustrates a block diagram of an apparatus for wireless communication including a baseband chip and an RF chip, according to some embodiments of the present disclosure.

As one example of known solutions, FIG. 2 illustrates a block diagram of an apparatus 200 for wireless communication including a baseband chip 202 and an RF chip 204, according to some embodiments of the present disclosure. Apparatus 200 includes baseband chip 202 configured to generate and transmit modulated symbols (e.g., OFDM symbols) to RF chip 204 through digital interfaces between baseband chip 202 and RF chip 204 (not shown). RF chip 204, operatively coupled to baseband chip 202 and an antenna 206, is configured to transmit the modulated symbols in RF signals through antenna 206. Baseband chip 202 may include a modulation module 208, an OFDM module 210, a cyclic prefix (CP) insertion module 212, a pulse-shaping module 214, and a gain control module 216 in the uplink. RF chip 204 may include a digital-to-analog converter (DAC) 218 and an RF front-end (FE) 220 in the uplink. It is understood that additional modules in the downlink of baseband chip 202 and RF chip 204 are omitted for ease of description.

Modulation module 208 may be configured to modulate the raw data from a host chip or raw data after coding (e.g., source coding and/or channel coding) using any suitable modulation techniques, such as multi-phase pre-shared key (MPSK) modulation or quadrature amplitude modulation (QAM). OFDM module 210 may be configured to generate a stream of OFDM symbols on multiple subcarriers based on the modulated data. In some embodiments, OFDM module 210 includes a serial-to-parallel converter, an inverse fast Fourier transform (IFFT) unit, and a parallel-to-serial converter. Cyclic prefix insertion module 212 may be configured to insert a cyclic prefix (e.g., the last portion of the OFDM symbol) at the beginning of each OFDM symbol with guard interval exceeding delay spread of the multipath channel to mitigate the effect of ISI. Pulse-shaping module 214 may be configured to smooth the transition between symbols for out-of-band (OOB) attenuation, and gain control module 216 may apply digital gain adjustment to the symbols to adjust the gain (e.g., power or amplitude) of each symbol.

RF chip 204 may include a DAC 218 and an RF front-end (FE) 220. DAC 218 may be configured to convert the stream of symbols in digital signals into analog signals (e.g., radio signals). RF front-end 220 (also known as "analog front-end") may include any elements between antenna 206 and digital-to-analog converter 218, which handles analog signals. RF front-end 220 may include, for example, RF filters, RF amplifiers, local oscillators, and mixers.

It is understood that the functions performed by apparatus 200 may have different allocation implementations between baseband chip 202 and RF chip 204. For example, the gain control adjustment and pulse-shaping may both be applied on a digital front-end (not shown) of RF chip 204, or on baseband chip 202 and the digital front-end of RF chip 204, respectively. As illustrated in FIG. 2, the signals to be transmitted by the SoC (e.g., apparatus 200) are modulated on the baseband chip (e.g., baseband chip 202). The RF chip (e.g., RF chip 204) normally lacks the ability to generate testing signals (e.g., having equivalent properties in the time and frequency domains to a symbol transmitted by the RF chip in a working environment) for self-testing and/or self-calibration on a full range of working bandwidth without the involvement of the baseband chip. In some embodiments, RF chip 204 may implement the waveform generation scheme described in detail below, and thus could conduct self-testing and/or self-calibration on the full range of working bandwidth without the involvement of the baseband chip.

Figure 3:
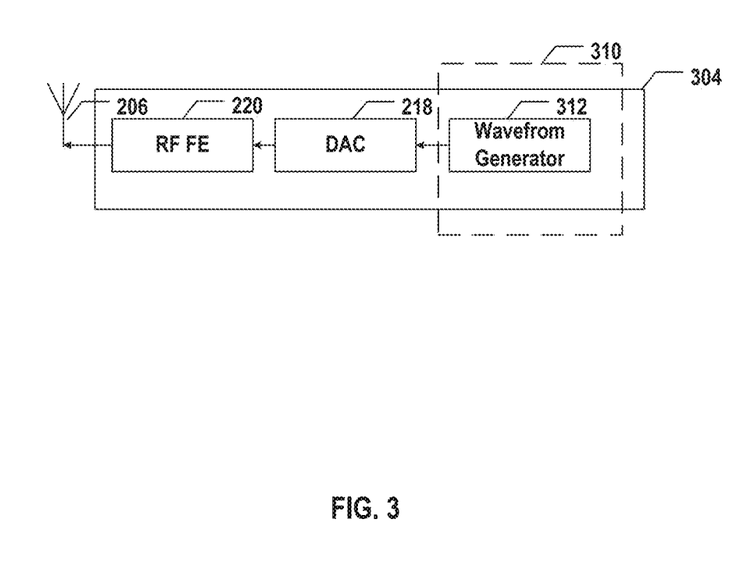
FIG. 3 illustrates a block diagram of an exemplary RF chip having a waveform generator for self-testing, according to some embodiments of the present disclosure.

FIG. 3 illustrates a block diagram of an exemplary RF chip having a waveform generator for self-testing, according to some embodiments of the present disclosure. In some embodiments, RF chip 304 can be implemented by processor 802, memory 804, and transceiver 806. For ease of illustration, the same components in RF chips 204 and 304 will not be repeated. RF chip 304 includes a digital front-end 310 having a waveform generator 312 (e.g., a waveform generation module) configured to generate testing signals with different waveforms on a full range of working bandwidth of RF chip 304. Waveform generator 312 may be configured to generate testing signals based on different pseudo-random binary sequences and various RB configurations and may be configured to transmit the testing signal to DAC 218 for conversion, and later be transmitted by RF front-end 220 in a similar manner to signals (e.g., OFDM symbols) modulated by a baseband chip (e.g., baseband chip 202 shown in FIG. 2). In this way, the functioning performance for the RF chip (e.g., DAC 218 and/or RF front-end 220 of RF chip 304) may be tested without the involvement of a baseband chip. It is understood that besides the various modules of RF chip 304 in the uplink shown in FIG. 3, any other suitable modules, such as modules in the downlink, may be included in RF chip 304 as well and are omitted for ease of description.

Compared with existing RF chip waveform generation schemes, waveform generator 312 can utilize an IFFT module with reduced size (e.g., having less than 4096 IFFT points) to generate testing signals having equivalent properties (e.g., in both time and frequency domains) to waveforms generated by an IFFT module with higher resolutions (e.g., full 4096-point IFFT). Also, different waveforms (e.g., testing signals) with various RB configurations can be generated without being uploaded (e.g., to an outside circuit) ahead of time.

Figure 4:
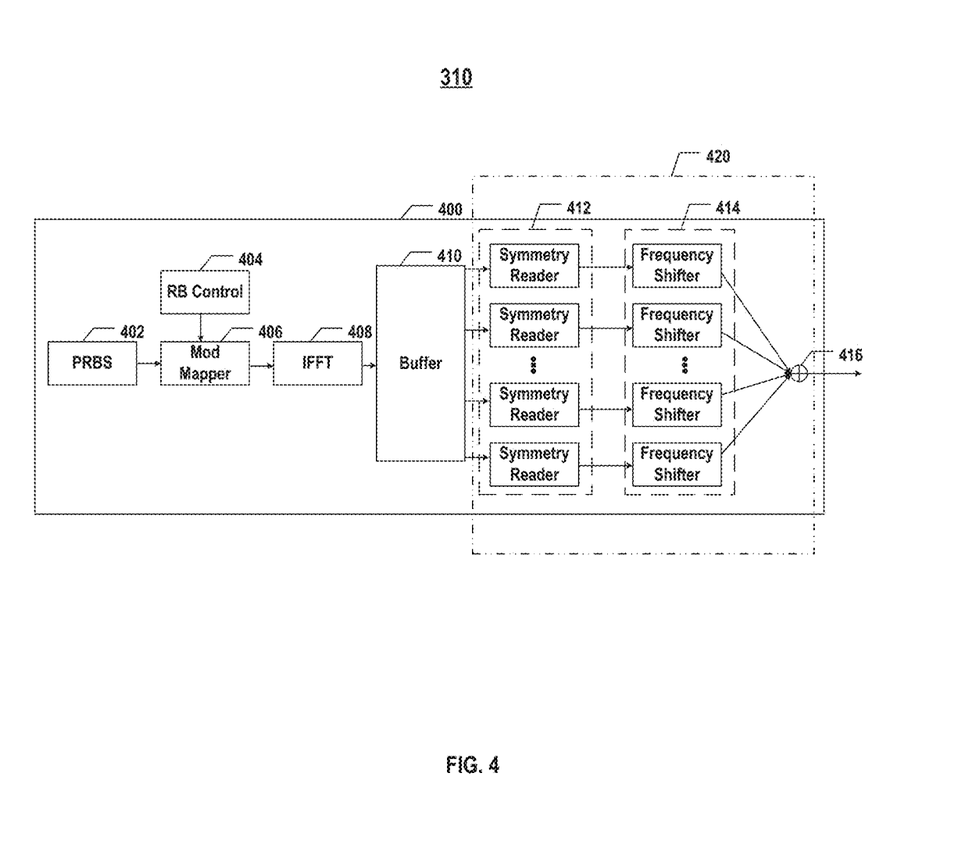
FIG. 4 illustrates an exemplary digital front-end of the RF chip shown in FIG. 3, having a waveform generator, according to some embodiments of the present disclosure.

For example, FIG. 4 illustrates an exemplary digital front-end 310 having waveform generator 400, according to some embodiments of the present disclosure. Waveform generator 400 may perform as waveform generator 312 shown in FIG. 3. It is understood that besides the various modules of waveform generator 400 in the uplink shown in FIG. 4, any other suitable modules such as a pulse-shaping module, a gain control module, and/or modules in the downlink may be included in digital front-end 310.

As illustrated in FIG. 4, waveform generator 312 may include a pseudo-random binary sequence (PRBS) module 402 configured to generate pseudo-random binary sequences, a resource block (RB) control module 404 configured to generate different RB configurations (e.g., can avoid generating modulated IFFT samples for empty RB configurations), and a mod mapper 406 configured to modulate the pseudo-random binary sequences generated by PRBS module 402 (e.g., using Quadrature Phase Shift Keying (QPSK), QAM, 64QAM, 256QAM, etc.), and may map the modulated pseudo-random binary sequences to generate input IFFT sample(s) based on the RB configurations generated by RB control module 404.

Waveform generator 400 may further include an IFFT module 408 with a reduced size (e.g., having M-point IFFT) configured to generate M-point IFFT sample(s) (e.g., an M-point I/Q sample in the time domain), and a buffer 410 to store the M-point IFFT sample. M is a positive integer. In some embodiments, waveform generator 400 may further include an IFFT sample transformation module 420 configured to transform the M-point IFFT sample into an L-point IFFT testing signal, where L is a positive integer greater than M, and M is a factor of L.

In some embodiments, IFFT sample transformation module 420 may include symmetric readers 412, frequency shifters 414, and an adder 416. For example, symmetric readers 412 may be configured to read the M-point IFFT sample from buffer 410 and generate N different output IFFT samples, where N is a positive integer and N=L/M. Symmetric readers 412 may also be configured to transmit the N different output IFFT samples to frequency shifters 414 for central frequency shifting. The modulated N output IFFT samples may be combined/added by adder 416 to generate the L-point IFFT testing signal. In some embodiments, L=4096, such that the generated L-point IFFT testing signal has equivalent properties (e.g., in both time and frequency domains) to waveforms generated by a full 4096-point IFFT module. This can save the cost for waveform generator 400 and reduce the computing power and system resource taken by waveform generator 400 when testing and/or calibrating RF chip 304. It is understood that L may be greater than 4096 or less than 4096. So long as M×N=L, any suitable combination of positive integers M, N, and L can be applied. The same notions of M, N, and L will apply to all the different embodiments throughout the entire description and will not be repeated for ease of description.

In some embodiments, to generate the L-point IFFT testing signal using an IFFT module with reduced size (e.g., M-point IFFT module), the symmetric property of the FFT may be exploited. For one specific example, IFFT module 408 may be a 1024-point IFFT module (e.g., M=1024), the L-point IFFT testing signal may be a 4096-point IFFT testing signal (e.g., L=4096), and symmetric readers 412 may include 4 symmetric readers (e.g., N=4).

In some embodiments, IFFT module 408 may be configured to generate a 1024-point IFFT sample (e.g., a 1024-point time domain I/Q sample) based on the input IFFT sample generated by mod mapper 406. The 1024-point IFFT sample may be stored in buffer 410 and be read by each symmetric reader of 4 symmetric readers 412. In some embodiments, each of symmetric readers 412 may be implemented by processor 802, and buffer 410 may be implemented by memory 804.

To generate 4096-point IFNT testing signal, each of 4 symmetric readers 412 may respectively read the 1024-point IFFT sample from buffer 410 and may respectively generate an output IFFT sample (e.g., waveforms having 1024-point IFFT) by transforming the 1024-point IFFT sample using different algorithms Thus, 4 output IFFT samples generated by 4 symmetric readers 412 can be different from one another. This can ensure the pseudo-randomness of the 4096-point IFFT testing signal generated based on the 4 different output IFFT samples, and thus can better be used for testing the performance of the RF chip (e.g., RF chip 304 in FIG. 3) on the full range of working bandwidth.

Before being combined, the 4 different output IFFT samples may each be shifted by a respective frequency shifter of frequency shifter 414 may shift the central frequency of the respective output IFFT sample such that the central frequencies of the 4 different output IFFT samples are separated (e.g., shifted the central frequency to 10 MHz, 20 MHz, 30 MHz, and 40 MHz respectively). In this way, the 4096-point IFFT testing signal generated based on the 4 different output IFFT samples may have better coverage for the full range of working bandwidth. Frequency shifter 414 may have at least the same number of frequency shifters as the number of symmetric readers in symmetric readers 412 (e.g., 4 frequency shifters in the current example), such that the output IFFT sample from each of symmetric readers 412 can be shifted and later be combined/added simultaneously. For example, after the frequency shifting, each of the shifted 4 output IFFT samples may have equivalent properties in the time and frequency domains to 1024-point IFFT signals (e.g., OFDM symbols) having the same central frequency and transmitted by RF chip 304 in the working environment. After the combination performed by adder 416, the generate 4096-point IFFT testing signal may simulate the signals (e.g., OFDM symbols) transmitted by RF chip 304 in the working environment (e.g., having the equivalent properties in the time and frequency domains) on a full range of working bandwidth.

To ensure the uniqueness of the 4 output IFFT samples (e.g., each output IFNT sample is different/nonrepeat from the others), each symmetric reader of symmetric readers 412 may apply different algorithms on the same 1024-point IFFT sample when generating the output IFFT sample. Accordingly, when being shifted and being added together, the generated 4096-point IFFT testing signal may have better pseudo randomness and may have equivalent properties (e.g., in both time and frequency domains) to waveforms generated by a full 4096-point IFFT module. For example, to ensure each output IFFT sample generated by each of 4 symmetric readers 412 is different/nonrepeat from one another, algorithms exploiting the symmetric property of FFT can be used. For example, 4 symmetric readers 412 can each: 1) keep the 1024-point IFFT sample itself (e.g., multiply the 1024-point IFFT sample by 1), 2) generate the conjugation of the 1024-point IFFT sample (e.g., change the sign of the imaginary part of the 1024-point IFFT sample), 3) generate the negation of the 1024-point IFFT sample (e.g., change the sign of both the real part and the imaginary part of the 1024-point IFFT sample), and 4) change the sign of the real part of the 1024-point IFFT sample respectively to transform the 1024-point IFFT sample. By doing so, each of the output IFFT samples of the 4 the symmetric reader can be different from one another.

Accordingly, to generate N different output IFFT samples (e.g., N=4 in the current example), IFFT module 408 needs only to generate one M-point IFFT sample (e.g., M=1024 in the current example). The N symmetric readers 412 can apply N different algorithms to the same M-point IFFT sample to generate N different output IFFT samples. As the IFFT module 408 only needs to run once (e.g., generate only one M-point IFNT sample) for generating the L-point IFFT testing signal, the computing power and system resource taken by waveform generator 400 when testing and/or calibrating RF chip 304 can be reduced.

It is understood that the number of IFFT points M of IFFT module 408 (e.g., the number of IFFT points in the IFFT sample, generated by IFFT module 408) and the number N of symmetric readers 412 are not limited to M=1024 and N=4 as described with respect to the current example. So long as M is a factor of L and M×N=L, any suitable combination of M and N can be applied. For example, when L=4096, M can be 128, 256, 512, 1024, etc., and N can be 32, 16, 8, 4, etc. correspondingly.

Also, it is understood that the different algorithms taken by each symmetric reader of symmetric readers 412 are not limited to changing the sign of the real part and/or the imaginary part of the M-point IFFT sample (e.g., to conjugate and/or to negate). Any suitable algorithms that when being applied to the M-point IFFT sample, can generate N different output IFFT samples, can be applied by symmetric readers 412 to transform the M-point IFFT sample.

Figure 5:
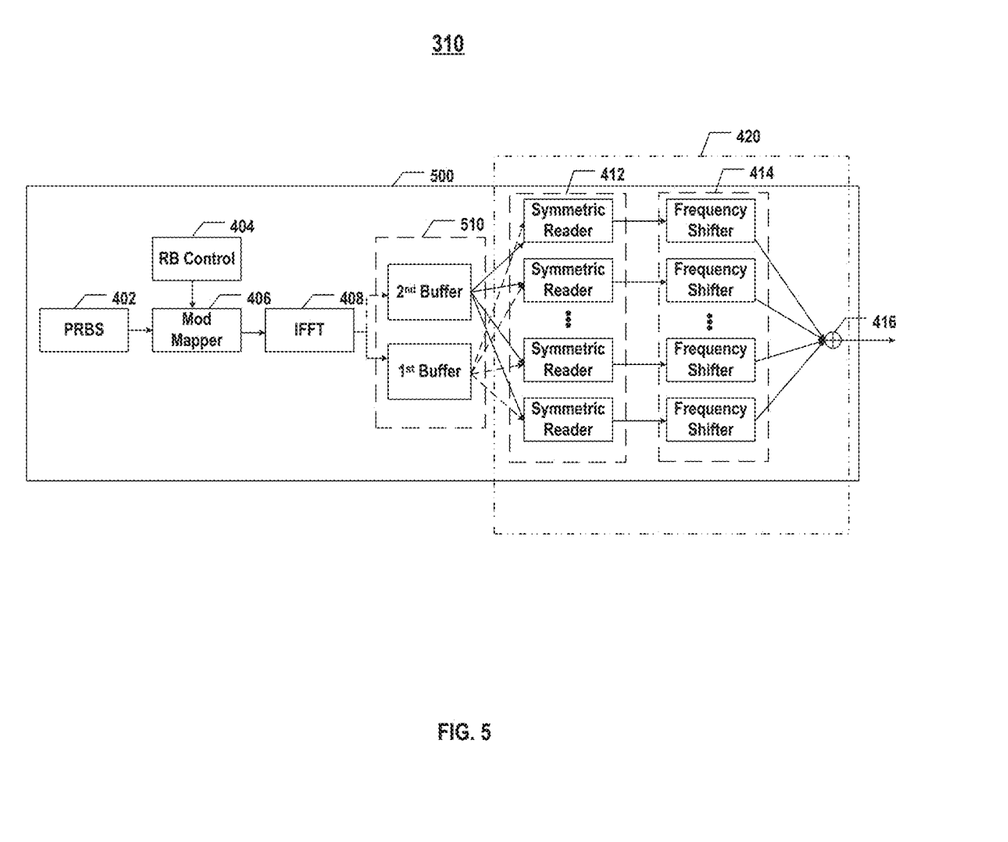
FIG. 5 illustrates another exemplary digital front-end of the RF chip shown in FIG. 3, having a waveform generator, according to some embodiments of the present disclosure.

FIG. 5 illustrates another exemplary digital front-end 310 having waveform generator 500, according to some embodiments of the present disclosure. Waveform generator 500 may perform as waveform generator 312 in FIG. 2. For ease of illustration, the same notions and components in waveform generators 400 and 500 will not be repeated. It is understood that besides the various modules of waveform generator 500 in the uplink shown in FIG. 5, any other suitable modules such as a pulse-shaping module, a gain control module, and/or modules in the downlink may be included in digital front-end 310.

Different from waveform generator 400, waveform generator 500 may include a pair of ping-pong buffer 510 including a first buffer and a second buffer. The rest part of waveform generator 400 may be similar to or be the same as it is in waveform generator 400.

In some embodiments, the first buffer and the second buffer of ping-pong buffer 510 can perform the reading (e.g., from IFFT module 408) and feeding (e.g., to symmetric readers 412) in an alternative manner (e.g., the role of the first buffer and the second buffer changes dynamically). For example, at a first cycle $C_a$, the first buffer receives and stores a first M-point IFFT sample generated by IFFT module 408. At the next cycle $C_{a+1}$, the second buffer of ping-pong buffer 510 receives and stores a second M-point IFFT sample generated by IFFT module 408. At the same time, the first buffer feeds the stored first M-point IFFT sample to N symmetric readers 412 similar to buffer 410 in FIG. 4 for generating the output IFFT sample and release the storing space. At a next cycle $C_{a+2}$, the first buffer receives and stores a third M-point IFFT sample generated by IFFT module 408, while the second buffer feeds the stored second M-point IFFT sample to N symmetric readers 412 for generating the output IFFT sample and release the storing space. In each cycle, symmetric readers 412 perform the same or similar transformation to the received M-point IFFT sample as they do in waveform generator 400.

Figure 6:
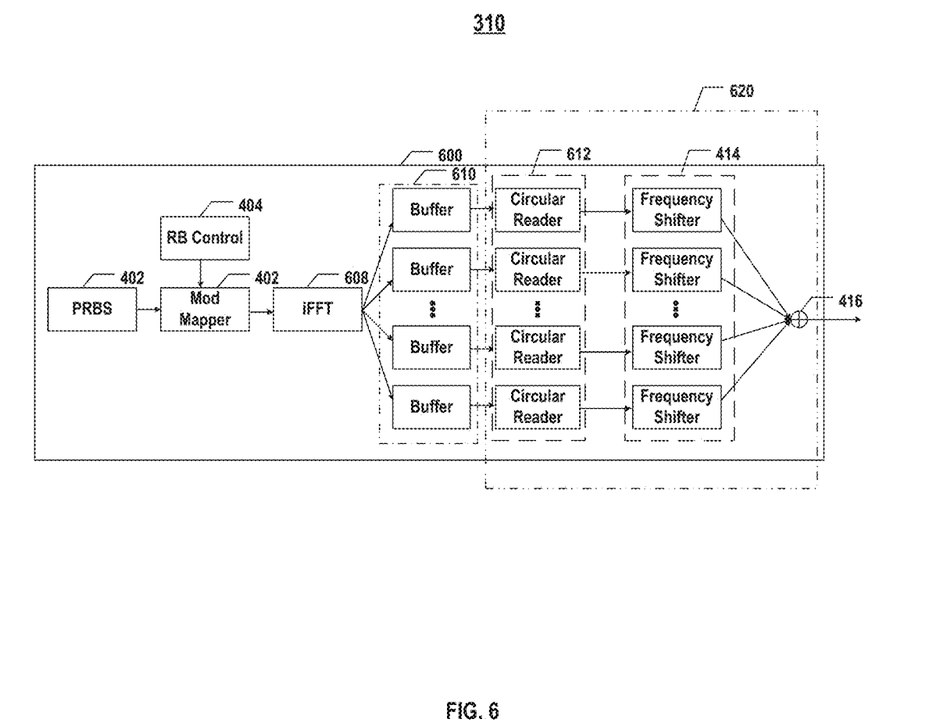
FIG. 6 illustrates another exemplary digital front-end of the RF chip shown in FIG. 3, having a waveform generator, according to some embodiments of the present disclosure.

FIG. 6 illustrates another exemplary digital front-end 310 having waveform generator 600, according to some embodiments of the present disclosure. Waveform generator 600 may perform as waveform generator 312 in FIG. 2. For ease of illustration, the same notions and components in waveform generators 400, 500, and 600 will not be repeated. It is understood that besides the various modules of waveform generator 600 in the uplink shown in FIG. 6, any other suitable modules such as a pulse-shaping module, a gain control module, and/or modules in the downlink may be included in digital front-end 310.

Different from waveform generator 500, IFFT module 608 in waveform generator 600 may generate different IFFT samples for N times in a streamlined manner (e.g., one at a time) based on N different input IFFT samples (e.g., generated based on different pseudo-random binary sequence generated by PRBS module 402 and/or different RB configurations generated by RB control module 404). Different from waveform generator 500, waveform generator 600 may include N buffers in buffers 610, each being configured to store a respective M-point IFFT sample of the N different M-point IFFT samples generated by IFFT module 608. Accordingly, transformation module 620 may include N circular readers 612 and each of N circular readers 612 can read a different M-point IFFT sample from a respective buffer of buffer 610.

As each of N circular readers 612 reads a different M-point IFFT sample from the respective buffer of buffer 610, each of N circular readers 612 may generate the output IFFT sample by outputting the M-point IFFT sample that is read from the one of N circular readers 612 and keep the N output IFFT samples different/nonrepeat from one another.

Although as shown in FIGS. 4-6, frequency shifters 414 and adder 416 are part of waveform generators 400, 500, and 600. In some embodiments, frequency shifters 414 and adder 416 may be in a different part of waveform generator 400, 500, or 600. For example, frequency shifters 414 and adder 416 may be components of the existing symbol processing chain on digital front-end 310 and/or RF chip 304, such that waveform generator 400, 500, or 600 can further reduce in size by reusing the existing components on RF chip 304.

In some other embodiments, although shown as in FIG. 6, buffer 610 is part of waveform generator 600, in some embodiments, buffer 610 may be in a different part of waveform generator 600. For example, buffer 610 may be part of the existing components of digital front-end 310 and/or RF chip 304, such that waveform generator 600 can further reduce in size by reusing the existing components on RF chip 304.

Figure 7:
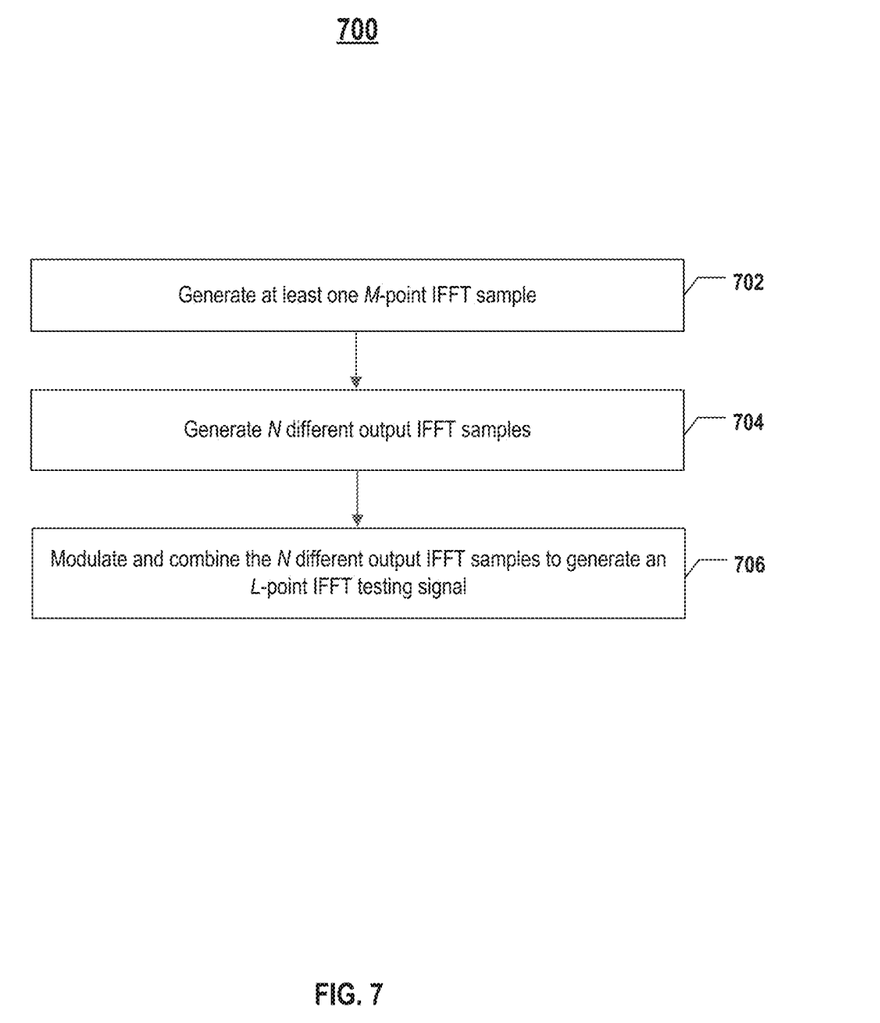
FIG. 7 illustrates a flow chart of an exemplary method for self-testing implementation on an RF chip, according to some embodiments of the present disclosure.

FIG. 7 illustrates a flow chart of an exemplary method 700 for self-testing implementation on an RF chip, according to some embodiments of the present disclosure. Examples of the apparatus that can perform operations of method 700 include, for example, RF chip 304 depicted in FIG. 3 or any other suitable apparatus disclosed herein. It is understood that the operations shown in method 700 are not exhaustive and that other operations can be performed as well before, after, or between any of the illustrated operations. Further, some of the operations may be performed simultaneously, or in a different order than shown in FIG. 7.

Referring to FIG. 7, method 700 starts at operation 702, in which at least one M-point IFFT sample is generated by an IFFT module with reduced size (e.g., an M-point IFFT module). For example, at least one M-point IFFT sample is generated based on an RB configuration and a pseudo-random binary sequence. As shown in FIGS. 4-6, IFFT module 408 of digital front-end 310 may generate at least one M-point IFFT sample based on pseudo-random binary sequence(s) generated by PRBS module 402 and RB configuration(s) (e.g., 12×15 kHz tones/subcarriers) generated by RB control module 404.

Method 700 proceeds to operation 704, as illustrated in FIG. 7, in which N different output IFFT samples are generated based on the at least one M-point IFFT sample by N readers. In some embodiments, as shown in FIG. 4 or 5, each symmetric reader of N symmetric readers 412 may respectively read the M-point IFFT sample from buffer 410 or one of the buffer in ping-pong buffer 510 and may respectively transform the M-point IFFT sample (e.g., by applying different algorithms exploiting the symmetric property of FFT) to generate the output IFFT sample as described above. In some other embodiments, as shown in FIG. 6, each circular reader of N circular readers 612 may respectively read one of N different IFFT samples from buffers (e.g., buffers 610 in FIG. 6), and may output the IFFT sample read from the buffers to generate the output IFFT sample as described above.

Method 700 proceeds to operation 706, as illustrated in FIG. 7, in which the N different output IFFT samples may be frequency shifted and combined/added to generate an L-point IFFT testing signal for self-testing and/or self-calibration of the function of the RF chip. As shown in FIGS. 4, 5, and 6, N different output IFFT samples may respectively be frequency shifted by one frequency shifter of frequency shifters 414 and be combined/added by adder 416 to generate the L-point IFNT testing signal.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 800 in FIG. 8. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to one aspect of the present disclosure, an RF chip includes an RF front-end and a digital front-end. The digital front-end includes an IFFT module configured to generate at least one M-point IFFT sample, where M is a positive integer, and an IFFT sample transformation module configured to generate an L-point IFFT testing signal based on the at least one M-point IFFT sample. L is a positive integer greater than M and the L-point IFFT testing signal is configured to test a function of the RF chip.

In some embodiments, the digital front-end further includes a mod mapper module configured to generate an input IFFT sample based on an RB configuration and a pseudo-random binary sequence.

In some embodiments, to generate the at least one M-point IFFT sample, the IFFT module is configured to generate the at least one M-point IFFT sample based on the input IFFT sample.

In some embodiments, the IFFT sample transformation module further includes N readers each configured to generate an output IFFT sample based on one of the at least one M-point IFFT sample. Each of the output IFFT samples of the N readers is different from one another.

In some embodiments, the IFFT sample transformation module further includes N frequency shifters, each of the N frequency shifters being configured to shift a central frequency of an output IFFT sample generated by a respective reader of the N readers to separate the central frequencies of the output IFFT samples of the N readers. The IFFT sample transformation module further includes an adder configured to combine the shifted output IFFT samples to generate the L-point IFFT testing signal.

In some embodiments, the digital front-end further comprises at least one buffer configured to store the at least one M-point IFFT sample.

In some embodiments, the digital front-end further includes a pair of ping-pong buffers configured to store, in a first buffer of the pair of ping-pong buffers, a first M-point IFFT sample received from the IFFT module and feed, by a second buffer of the pair of ping-pong buffers, a second M-point IFFT sample stored in the second buffer to the N symmetric readers, wherein roles of the first buffer and the second buffer are dynamically changed.

In some embodiments, each of the N readers is a symmetric reader, and to generate the output IFFT sample, each of the N symmetric readers is further configured to read the one of the at least one M-point IFFT sample from the at least one buffer and transform the one of the at least one M-point IFFT sample read from the at least one buffer to generate the output IFFT sample. Each algorithm applied by a respective symmetric reader to transform the one of the at least one M-point IFFT sample is different from one another In some embodiments, the IFFT module is configured to generate N M-point IFFT samples that are different from one another, and each of the N readers is a circular reader.

In some embodiments, the digital front-end further includes N buffers, each configured to store one of the N M-point IFFT samples. To generate the output IFFT sample, each of the N circular readers is configured to read the one M-point IFFT sample stored in a respective buffer of the N buffers and output the one M-point IFFT sample to generate the output IFFT sample.

In some embodiments, the L-point IFFT testing signal comprises a 4096-point IFFT CP-OFDM waveform.

In some embodiments, wherein L=4096, M is a factor of 4096, and M×N=4096.

According to another aspect of the present disclosure, an RF chip includes a digital front-end including an IFFT module, N readers where N is a positive integer, N frequency shifters, and an adder. The IFFT module is configured to generate at least one M-point IFFT sample based on an RB configuration and a pseudo-random binary sequence, where M is a positive integer. Each of the N readers is configured to generate an output IFFT sample based on one of the at least one M-point IFFT sample. Each of the generated N output IFFT samples is different from one another. Each of the N frequency shifters is configured to shift a central frequency of an output IFFT sample generated by a respective reader of the N readers to separate the central frequencies of the output IFFT samples of the N readers. The adder is configured to combine the shifted N output IFFT samples to generate an L-point IFFT testing signal, where L is a positive integer greater than M and M×N=L.

In some embodiments, the digital front-end further comprises at least one buffer configured to store the at least one M-point IFFT sample.

In some embodiments, the digital front-end further includes a pair of ping-pong buffers configured to store, in a first buffer of the pair of ping-pong buffers, a first M-point IFFT sample received from the IFFT module and feed, by a second buffer of the pair of ping-pong buffers, a second M-point IFFT sample stored in the second buffer to the N symmetric readers, wherein roles of the first buffer and the second buffer are dynamically changed.

In some embodiments, each of the N readers is a symmetric reader, and to generate the output IFFT sample, each of the N symmetric readers is further configured to read the one of the at least one M-point IFFT sample from the at least one buffer and transform the one of the at least one M-point IFFT sample read from the at least one buffer to generate the output IFFT sample. Each algorithm applied by a respective symmetric reader to transform the one of the at least one M-point IFFT sample is different from one another In some embodiments, the IFFT module is configured to generate N M-point IFFT samples that are different from one another, and each of the N readers is a circular reader.

In some embodiments, the digital front-end further includes N buffers, each configured to store one of the N M-point IFFT samples. To generate the output IFFT sample, each of the N circular readers is configured to read the one M-point IFFT sample stored in a respective buffer of the N buffers and output the one M-point IFFT sample to generate the output IFFT sample.

According to still another aspect of the present disclosure, a method for self-testing of an RF chip is disclosed. At least one M-point IFFT sample is generated based on an RB configuration and a pseudo-random binary sequence, where M is a positive integer. N output IFFT samples are generated based on the at least one M-point IFFT sample, where N is a positive integer. Each of the generated N output IFFT samples is different from one another. Each of the N output IFFT samples is shifted to separate the central frequencies of the output IFFT samples. The shifted N output IFFT samples are combined to generate an L-point IFNT testing signal configured to test a function of the RF chip, where L is a positive integer greater than M and M×N=L.

In some embodiments, the L-point IFFT testing signal comprises a 4096-point IFFT CP-OFDM waveform.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A radio frequency (RF) chip comprising:
   a RF front-end; and
   a digital front-end comprising:
      a waveform generator configured to;
      generate at least one M-point inverse fast Fourier transform (IFFT) sample, where M is a positive integer; and
      generate an L-point IFFT testing signal based on the at least one M-point IFFT sample, where L is a positive integer greater than M,
      wherein the L-point IFFT testing signal is configured to test a function of the RF chip.

2. The RF chip of claim 1, wherein the waveform generator is further configured to generate an input IFFT sample based on a resource block (RB) configuration and a pseudo-random binary sequence (PRBS).

3. The RF chip of claim 2, wherein to generate the at least one M-point IFFT sample, the waveform generator is configured to generate the at least one M-point IFFT sample based on the input IFFT sample.

4. The RF chip of claim 3, wherein the waveform generator further comprises N readers each configured to generate an output IFFT sample based on one of the at least one M-point IFFT sample, where N is a positive integer, wherein each of the output IFFT samples of the N readers is different from one another.

5. The RF chip of claim 4, wherein the waveform generator further comprises:
   N frequency shifters, each of the N frequency shifters being configured to shift a central frequency of the output IFFT sample generated by a respective reader of the N readers to separate the central frequencies of the output IFFT samples of the N readers; and
   an adder configured to combine the shifted output IFFT samples to generate the L-point IFFT testing signal.

6. The RF chip of claim 5, wherein the waveform generator further comprises at least one buffer configured to store the at least one M-point IFFT sample.

7. The RF chip of claim 6, wherein the waveform generator further comprises:
   a pair of ping-pong buffers configured to:
      store, in a first buffer of the pair of ping-pong buffers, a first M-point IFFT sample; and
      feed, by a second buffer of the pair of ping-pong buffers, a second M-point IFFT sample stored in the second buffer to the N readers, wherein roles of the first buffer and the second buffer are dynamically changed.

8. The RF chip of claim 6, wherein each of the N readers is a symmetric reader, and to generate the output IFFT sample, each of the N symmetric readers is further configured to:
   read the one of the at least one M-point IFFT sample from the at least one buffer; and
   transform the one of the at least one M-point IFFT sample read from the at least one buffer to generate the output IFFT sample, wherein each algorithm applied by a respective symmetric reader to transform the one of the at least one M-point IFFT sample is different from one another.

9. The RF chip of claim 5, wherein the waveform generator is configured to generate N M-point IFFT samples that are different from one another, and each of the N readers is a circular reader.

10. The RF chip of claim 9, wherein the waveform generator further comprises:
    N buffers, each configured to store one of the N M-point IFFT samples; and
    to generate the output IFFT sample, each of the N circular readers is configured to:
       read the one M-point IFFT sample stored in a respective buffer of the N buffers; and
       output the one M-point IFFT sample to generate the output IFFT sample.

11. The RF chip of claim 1, wherein the L-point IFFT testing signal comprises a 4096-point IFFT cyclic prefix-orthogonal frequency division multiplexing (CP-OFDM) waveform.

12. The RF chip of claim 5, wherein L=4096, M is a factor of 4096, and M×N=4096.

13. A radio frequency (RF) chip comprising a digital front-end, the digital front-end comprising:
    a waveform generator configured to generate at least one M-point inverse fast Fourier transform (IFFT) sample based on a resource block (RB) configuration and a pseudo-random binary sequence (PRBS), where M is a positive integer;
    wherein the waveform generator comprises:
    N readers, each of the N readers being configured to generate an output IFFT sample based on one of the at least one M-point IFFT sample, wherein each of the generated N output IFFT samples is different from one another, where N is a positive integer;
    N frequency shifters, each of the N frequency shifters being configured to shift a central frequency of the output IFFT sample generated by a respective reader of the N readers to separate the central frequencies of the output IFFT samples of the N readers; and
    an adder configured to combine the shifted N output IFFT samples to generate an L-point IFFT testing signal, where L is a positive integer greater than M, wherein M×N=L.

14. The RF chip of claim 13, wherein the waveform generator further comprises at least one buffer configured to store the at least one M-point IFFT sample.

15. The RF chip of claim 14, wherein the waveform generator further comprises:
    a pair of ping-pong buffers configured to:
       store, in a first buffer of the pair of ping-pong buffers, a first M-point IFFT sample; and
       feed, by a second buffer of the pair of ping-pong buffers, a second M-point IFFT sample stored in the second buffer to one of the N readers, wherein roles of the first buffer and the second buffer are dynamically changed.

16. The RF chip of claim 14, wherein each of the N readers is a symmetric reader, and to generate the output IFFT sample, each of the N symmetric readers is further configured to:
    read the one of the at least one M-point IFFT sample from the at least one buffer; and
    transform the one of the at least one M-point IFFT sample read from the at least one buffer to generate the output IFFT sample, wherein each algorithm applied by a respective symmetric reader to transform the one of the at least one M-point IFFT sample is different from one another.

17. The RF chip of claim 13, wherein the waveform generator is configured to generate N M-point IFFT samples that are different from one another, and each of the N readers is a circular reader.

18. The RF chip of claim 17, wherein the digital front-end further comprises:
    N buffers, each configured to store one of the N M-point IFFT samples; and
    to generate the output IFFT sample, each of the N circular readers is configured to:
       read the one M-point IFFT sample stored in a respective buffer of the N buffers; and
       output the one M-point IFFT sample to generate the output IFFT sample.

19. A method for self-testing of a radio frequency (RF) chip, the method comprising:
    generating at least one M-point inverse fast Fourier transform (IFFT) sample based on a resource block (RB) configuration and a pseudo-random binary sequence (PRBS), where M is a positive integer;
    generating N output IFFT samples based on the at least one M-point IFFT sample, where N is a positive integer, wherein each of the generated N output IFFT samples is different from one another;
    shifting a central frequency of each of the N output IFFT samples to separate the central frequencies of the N output IFFT samples; and
    combining the shifted N output IFFT samples to generate an L-point IFFT testing signal configured to test a function of the RF chip, where L is a positive integer greater than M, wherein M×N=L.

20. The method of claim 19, wherein the L-point IFFT testing signal comprises a 4096-point IFFT cyclic prefix-orthogonal frequency division multiplexing (CP-OFDM) waveform.

* * * * *